United States Patent
Florkey et al.

(10) Patent No.: US 7,860,231 B2
(45) Date of Patent: Dec. 28, 2010

(54) PORTING A DIRECTORY NUMBER FOR A DURATION OF TIME

(75) Inventors: Cynthia Kae Florkey, Chicago, IL (US); Ruth Schaefer Gayde, Naperville, IL (US); Victoria Marie Halsell, Aurora, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1050 days.

(21) Appl. No.: 10/768,409

(22) Filed: Jan. 30, 2004

(65) Prior Publication Data

US 2005/0170826 A1 Aug. 4, 2005

(51) Int. Cl.
*H04M 7/00* (2006.01)
(52) U.S. Cl. ............. 379/221.13; 379/219; 379/220.01; 455/419; 455/433; 455/552.1; 370/352
(58) Field of Classification Search ............ 379/221.13; 455/419; 370/352
See application file for complete search history.

(56) References Cited

U.S. PATENT DOCUMENTS

| | | | | |
|---|---|---|---|---|
| 6,122,362 | A * | 9/2000 | Smith et al. .................. 379/230 |
| 6,138,023 | A * | 10/2000 | Agarwal et al. ............. 455/445 |
| 6,266,405 | B1 * | 7/2001 | Madour et al. ......... 379/220.01 |
| 6,584,193 | B1 * | 6/2003 | Petrunka ................ 379/266.01 |
| 6,785,372 | B1 * | 8/2004 | Moss et al. .............. 379/114.2 |
| 6,819,921 | B2 * | 11/2004 | Mazzarella et al. ......... 455/419 |
| 7,203,496 | B2 * | 4/2007 | Halsell ....................... 455/445 |
| 2005/0074110 | A1 * | 4/2005 | Moreman .............. 379/212.01 |

OTHER PUBLICATIONS

Techweb.com; "MSC"; http://www.techweb.com/encyclopedia/defineterm?term=MSC; Dec. 23, 2003; pp. 1-4, CMP Media, LLC, Seattle, WA, USA.
Techweb.com; "HLR"; http://www.techweb.com/encyclopedia/defineterm?term=HLR; Dec. 23, 2003; pp. 1-2, CMP Media, LLLC, Seattle, WA, USA.

* cited by examiner

*Primary Examiner*—Ahmad F Matar
*Assistant Examiner*—Khai N Nguyen
(74) *Attorney, Agent, or Firm*—Carmen Patti Law Group, LLC (57) ABSTRACT

The present invention provides an apparatus, method and article for porting a directory number for a duration of time. A portability component automatically updates one or more provisioning components to port the directory number for the duration of time. The value for the duration of time may be one or more of a period of time, a date in the future, or a permanent status. Upon the expiration of the duration of time, the portability component initiates one or more notifications of the expiration of the duration of time to a management component and/or the provisioning components to remove and/or alter the port of the directory number.

25 Claims, 5 Drawing Sheets

PORTING A DIRECTORY NUMBER FOR A DURATION OF TIME

TECHNICAL FIELD

The invention relates generally to telecommunications and more particularly to porting directory numbers associated with telephony devices.

BACKGROUND

Number portability ("NP") is a telecommunications network feature that enables a user of a telephony device to retain their directory number when changing service providers, service types, and/or locations. For example, the user may desire to temporarily try out a new telephony device and/or a new set of services while retaining their directory number. So, to port the directory from a first service provider to a second service provider, databases associated with the first and second service providers in one example are manually updated.

Before porting the directory number, the user receives service from the first service provider. Upon porting the directory number to the second service provider, the user receives service from the second service provider. To port the directory number between the service providers, one or more employees of the second service provider manually enter an association between the directory number and a location routing number into a database associated with the second service provider. The employees of the second service provider may also request that the first service provider manually updates a database associated with the first service provider.

After porting the number from the first service provider to the second service provider, the user may desire to restart service with the first service provider. So, the directory number must be ported back from the second service provider to the first service provider and the databases associated with the first and second service providers must be manually updated a second time. Manual updating of the databases may take several days. As one shortcoming, the user of the telephony device associated with the directory number may not receive service from either of the service providers until both the databases are updated. It is desirable for the user of the telephony device associated with the directory number to receive continuous service.

Thus, a need exists to reduce an amount of time required to port a directory number between service providers. A further need exists to reduce a duration of a potential service interruption experienced by a user while porting the directory number.

SUMMARY

The invention in one implementation encompasses an apparatus. The apparatus comprises a portability component that automatically updates one or more provisioning components to port a directory number for a duration of time.

Another embodiment of the invention encompasses a method. One or more provisioning components are automatically updated to port a directory number for a duration of time.

Yet another embodiment of the invention encompasses an article. The article comprises one or more computer-readable media. The article comprises means in the computer-readable medium for automatically updating one or more provisioning components to port a directory number for a duration of time.

DESCRIPTION OF THE DRAWINGS

Features of exemplary implementations of the invention will become apparent from the description, the claims, and the accompanying drawings in which:

DETAILED DESCRIPTION

Figure 1:
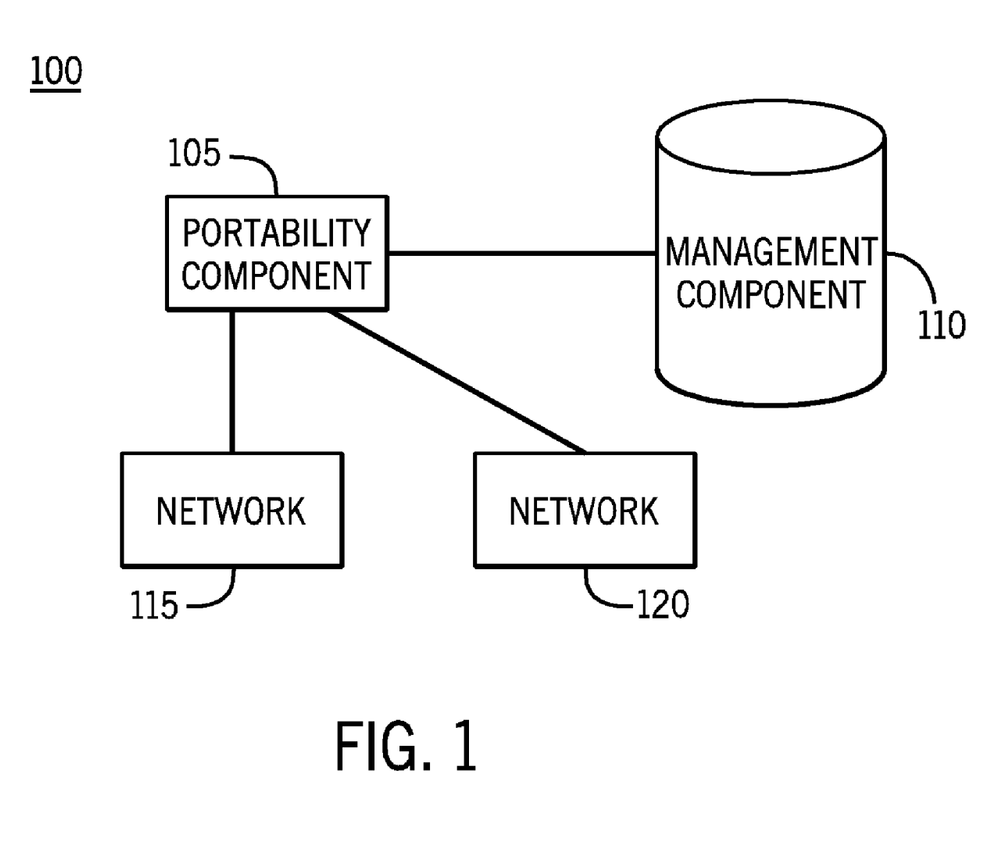
FIG. 1 is a representation of one exemplary implementation of an apparatus that comprises one or more portability components, one or more management components, and one or more networks.
Figure 2:
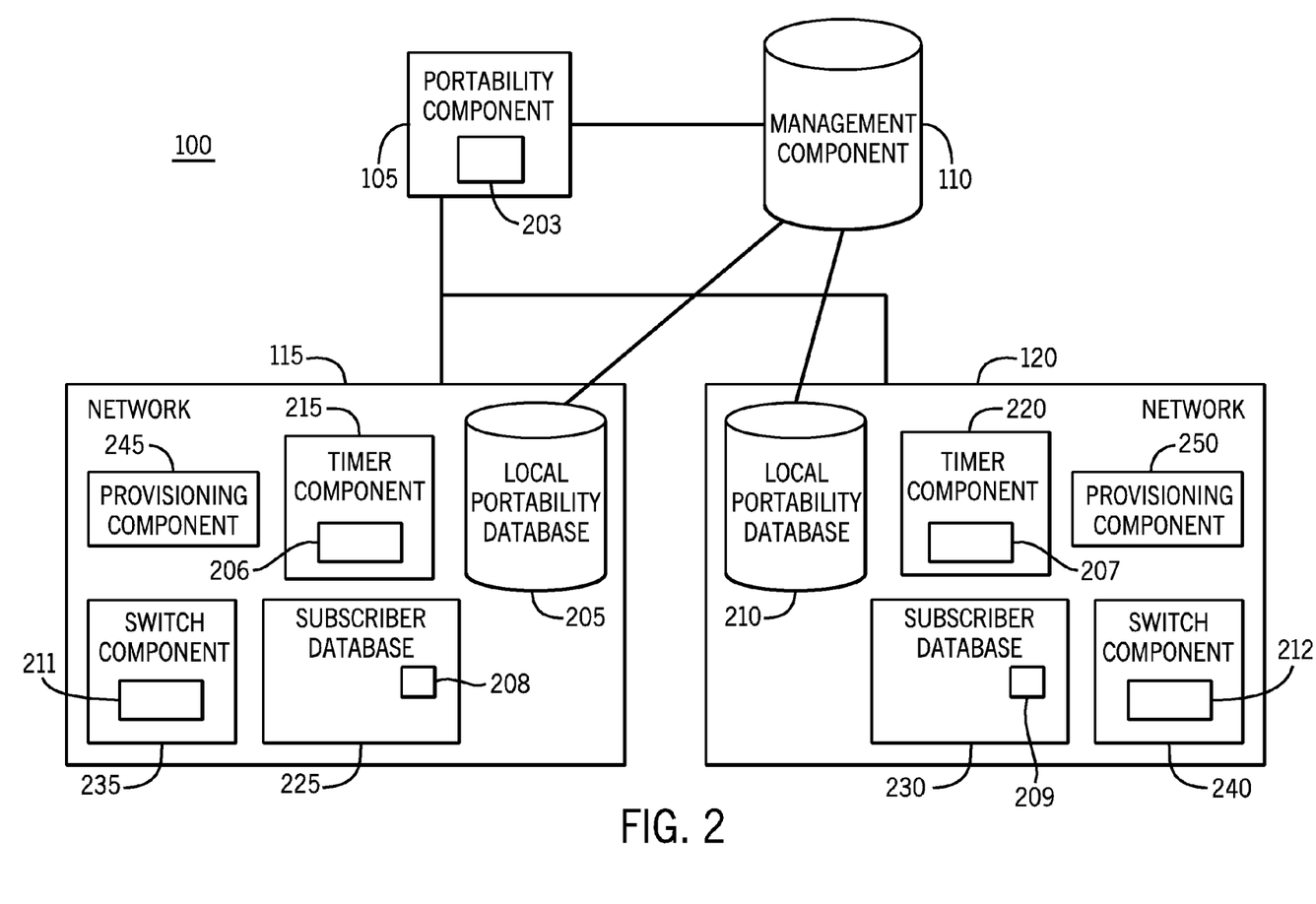
FIG. 2 is a representation of one or more components of the networks of the apparatus of FIG. 1. The networks comprise one or more local portability databases, one or more timer components, one or more subscriber databases, one or more switch components, and one or more provisioning components.

Turning to FIGS. 1-2, an apparatus 100 in one example comprises one or more portability components 105, one or more management components 110, and one or more networks 115 and 120. The networks 115 and 120 in one example comprise one or more telephony networks that are owned and/or operated by one or more service providers. The management component 110 in one example comprises a Number Portability Administration Center Service Management System ("NPAC"), as will be understood by those skilled in the art. The portability component 105 and the management component 110 communicate through employment of one or more protocols, for example, a Session Initiation Protocol ("SIP") or a Simple Network Management Protocol ("SNMP"). The portability component 105 and the networks 115 and 120 communicate through employment of one or more protocols, for example, SIP, an Internet Standard-41 ("IS-41"), and an Advanced Intelligence Network ("AIN").

The portability component 105 in one example provides information to port a directory number to the management component 110. The management component 110 in one example updates one or more local portability databases 205 and 210 associated with the networks 115 and 120. The portability component 105 provides information to one or more network components associated with the networks 115 and 120 to port the directory number. The networks 115 and 120 employ the information to provide and/or to terminate service for one or more telephony devices, for example, one or more wired telephones, wireless telephones, and/or personal computers, associated with the directory number.

The networks 115 and/or 120 in one example comprise the one or more local portability databases 205 and 210, one or more timer components 215 and 220, one or more subscriber databases 225 and 230, one or more switch components 235 and 240, and one or more provisioning components 245 and 250. In one example, the subscriber databases 225 and/or 230 comprise one or more home location registers, as will be understood by those skilled in the art. The subscriber databases 225 and/or 230 comprise one or more subscriber databases located within the switch components 235 and/or 240. The switch components 235 and/or 240 in one example comprise one or more telephony switches. The subscriber databases 225 and/or 230 and the switch components 235 and/or 240 in one example cooperate to provide and/or to terminate service to the telephony devices.

The provisioning components 245 and 250 in one example comprise one or more customer care centers associated with the networks 115 and 120, respectively. In one example, the provisioning components 245 and/or 250 initiate one or more requests to port a directory number for a duration of time to the portability component 105. In another example, the provisioning components 245 and/or 250 receive from the portability component 105 one or more updates for one or more directory numbers ported to the network 115. The updates in one example comprise the directory number or a location routing number ("LRN") and a value for the duration of time to port the directory number. Upon receipt of an update for a directory number, the provisioning components 245 and/or 250 notify the subscriber databases 225 and/or 230, respectively, of the directory number to port for the duration of time.

The local portability databases 205 and/or 210 in one example comprise one or more entries for one or more directory numbers that have been ported to/from the networks 115 and/or 120. The entries in one example comprises a directory number and a location routing number for a telephony device that is ported from the network 115 to the network 120, as will be understood by those skilled in the art. The timer components 215 and/or 220 in one example comprise one or more timers associated with one or more directory numbers associated with the telephony devices. In one example, the timer components 215 and/or 220 are resident in the subscriber databases 225 and/or 230, respectively. In another example, the timer components 215 and/or 220 are resident in the provisioning components 245 and/or 250. In yet another example, the timer components 215 and/or 220 are resident in the local number portability databases 205 and/or 210.

The portability component 105 in one example receives one or more requests to port a directory number for a duration of time from the provisioning components 245 and/or 250. A request to port a directory number in one example comprises an association between a ported-from number (directory number or location routing number) and a ported-to number (location routing number), one or more identifiers associated with one or more network components, and a value for the duration of time. In one example, a request to port a directory number comprises an association between the directory number and a location routing number. In another example, a request to port a directory number comprises an association between a first (old) location routing number and a second (new) location routing number. For example, if a directory number is ported more than one time, the request comprises an association between a first location routing number and a second location routing number. The identifiers associated with the one or more network components in one example comprise the provisioning components 245 and/or 250, and/or the subscriber databases 225 and/or 230. In one example, a first identifier is associated with a ported-from provisioning component, for example, the provisioning component 245, and a second identifier is associated with a ported-to provisioning component, for example, the provisioning component 250. The portability component 105 employs the identifiers to automatically update the one or more network components (e.g., the provisioning components 245 and/or 250 and/or the subscriber databases 225 and/or 230) upon receipt of the request. The value for the duration of time in one example indicates one or more of: a period of time, a date in the future, or a permanent status.

The portability component 105 in one example stores the association between the ported-from number (the directory number or the (old) location routing number) and the ported-to number (location routing number), the one or more identifiers, and the value for the duration of time. The portability component 105 employs the association to update the network components associated with the identifiers. In one example, upon receipt of a request to update a duration of time for a directory number, the portability component 105 employs the association to reset a value of the duration of time within the timer components 215 and 220. In another example, upon receipt of a request to make permanent the port of the directory number, the portability component 105 updates the network components associated with the one or more identifiers of the association.

Upon receipt of a request from the provisioning component 250, the portability component 105 employs one or more of the one or more identifiers to automatically update the provisioning component 245 of the request to port the directory number for the duration of time. In one example, the portability component 105 provides a value for the duration of time to the provisioning component 245. In another example, the portability component 105 provides an association between a ported-from telephony number (e.g., the directory number) and a ported-to telephony number (e.g., the location routing number) to the provisioning component 245. The provisioning component 250 in one example updates the subscriber database 230 upon receipt of the association. The portability component 105 automatically updates the management component 110 upon receipt of the request from the provisioning component 250.

The portability component 105 cooperates with the provisioning components 245 and 250 to port the directory number back to an initial state from a ported state upon an expiration of the duration of time. The initial state in one example comprises a service provider and/or a set of services provided to a telephony device associated with the ported-from number before the request to port the directory number. The ported state in one example comprises a service provider and/or a set of services provided to the telephony device associated with the ported-to number. Upon the expiration of the duration of time, the portability component 105 initiates one or more notifications of the expiration of the duration of time to the management component 110 and/or the provisioning components 245 and 250. In one example, the portability component 105 initiates a notification to the management component 110 to remove the port of the directory number to the location routing number. In another example, the portability component 105 initiates a notification to the management component 110 to alter the port of the directory number to port the directory number back to the ported-from telephony number. The portability component 105 initiates a notification to the provisioning components 245 and 250 to remove and/or alter the association.

The timer components 215 and/or 220 receive and store one or more values for one or more durations of time for one or more directory numbers. The timer components 215 and/or 220 employ a value of a duration of time to determine an expiration of the duration of time. In one example, the timer component 215 sends a notification of the expiration of the duration of time for a directory number to the portability component 105. In another example, the timer component 220 sends a notification of the expiration of the duration of time to the subscriber database 230.

The subscriber databases 225 and 230 and the switch components 235 and 240 in one example cooperate to provide and/or to withhold service for one or more telephony devices associated with the networks 115 and 120. The subscriber databases 225 and/or 230 in one example comprise one or more subscriber entries associated with one or more directory numbers. The subscriber entries in one example comprise one or more ported-out flags. The ported-out flags indicate a status of a directory number. If a ported-out flag is set, the directory number is ported from a network and/or a set of services. If the ported-out flag is not set (i.e., the ported-out flag is cleared), the directory number is not ported from the network and/or the set of services. For example, where the ported-out flag is set in a subscriber entry for a directory number in the subscriber database 225, the subscriber database 225 and the switch component 235 cooperate to withhold providing service to the directory number. In one example, the subscriber database 225 clears the ported-out flag associated with the directory number upon receipt of a notification of an expiration of the duration of time from the provisioning component 245.

The subscriber databases 225 and 230 and the switch components 235 and 240 in one example cooperate to provide one or more messages to a user of a telephony device associated with a directory number. In one example, the subscriber database 225 and the switch component 235 cooperate to provide a "failure to pay", or deadbeat, message to one or more callers to the directory number upon receipt of an expiration of the duration of time. In another example, the subscriber database 225 and the switch component 235 cooperate to provide a message to the user of the telephony device associated with the directory number indicating a period of time remaining until the expiration of the duration of time to port the directory number.

An illustrative description of exemplary operation of the apparatus 100 is presented, for explanatory purposes.

Figure 3:
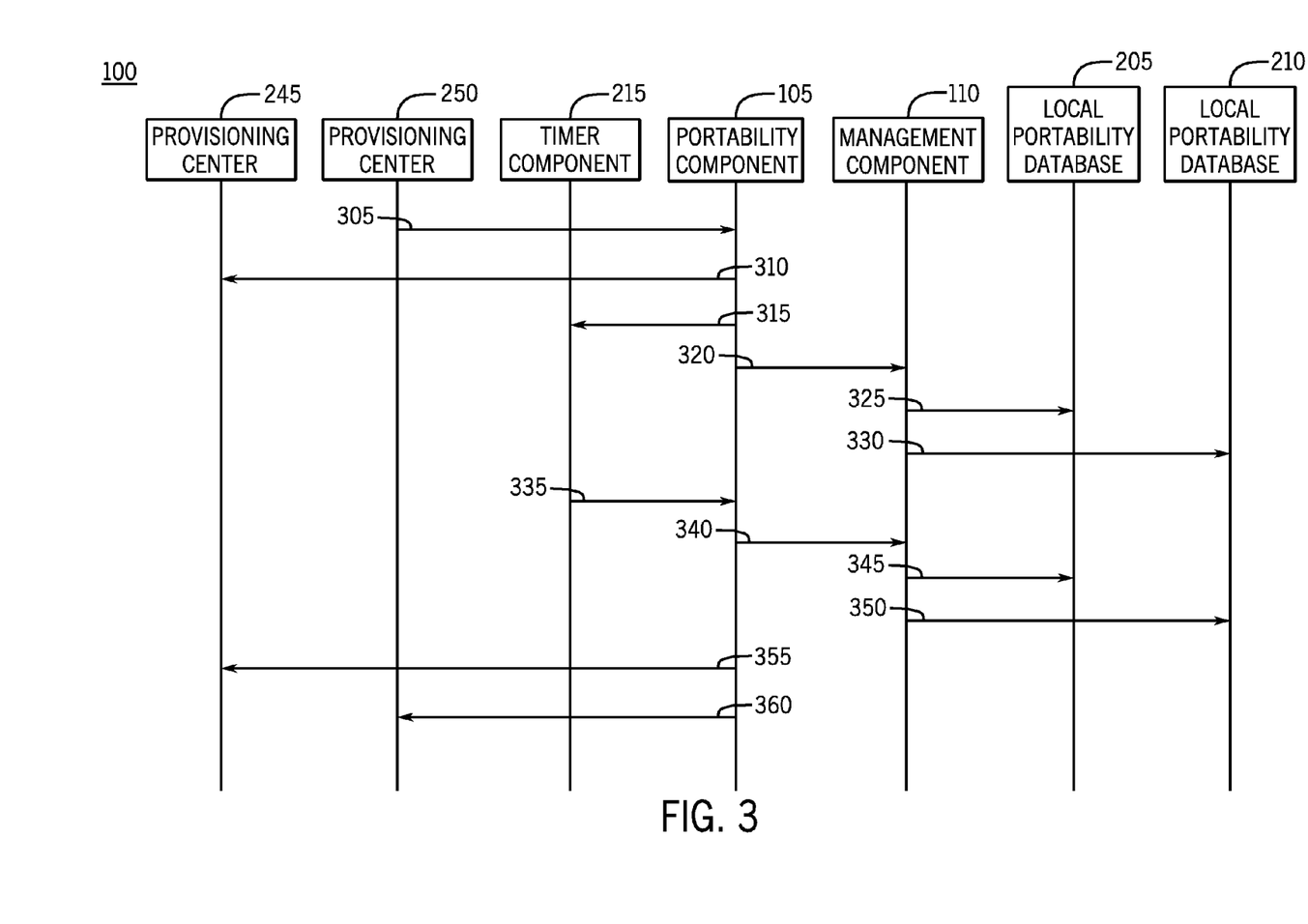
FIG. 3 is a representation of an exemplary process flow of a request to port a directory number for a duration of time received by the portability component from a provisioning component of the apparatus of FIG. 2.

Turning to FIG. 3, the provisioning component 245 requests to port a directory number from the network 115 to the network 120. In STEP 305, the provisioning component 245 initiates a request to port the directory number to the portability component 105. The request comprises a ported-from number as the directory number, a ported-to number as a location routing number, an identifier associated with the timer component 215, an identifier associated with the provisioning component 250, an identifier associated with the provisioning component 245, and a value for a duration of time of five days. In STEP 310, the portability component 105 employs the identifier associated with the provisioning component 250 to update the provisioning component 250. In STEP 315, the portability component 105 employs the identifier associated with the timer component 215 to provide the value for the duration of time of five days to the timer component 215. In STEP 320, the portability component 105 updates the management component 110 with the identifiers. In STEP 325, the management component 110 provides the association between the directory number and the location routing number to the local portability database 205. In STEP 330, the management component 110 provides the association between the directory number and the location routing number to the local portability database 210. The local portability database 210 stores the association between the directory number and the location routing number.

In STEP 335, the timer component 215 sends a notification of an expiration of the duration of time associated with the directory number to the portability component 105. In STEP 340, the portability component 105 notifies the management component 110 of the expiration of the duration of time. In STEP 345, the management component 110 notifies the local portability database 205 upon the expiration of the duration of time. The management component 110 removes the association between the directory number and the location routing number. In STEP 350, the management component 110 notifies the local portability database 210 to remove the association between the directory number and the location routing number. The local portability database 210 removes the entry.

In STEP 355, upon receipt of the notification of the expiration of the duration of time, the portability component 105 employs the identifier associated with the provisioning component 245 to update the provisioning component 245 to port the directory number back to an initial state. In STEP 360, the portability component 105 employs the identifier associated with the provisioning component 250 to update the provisioning component 250 to terminate service for the telephony device.

Figure 4:
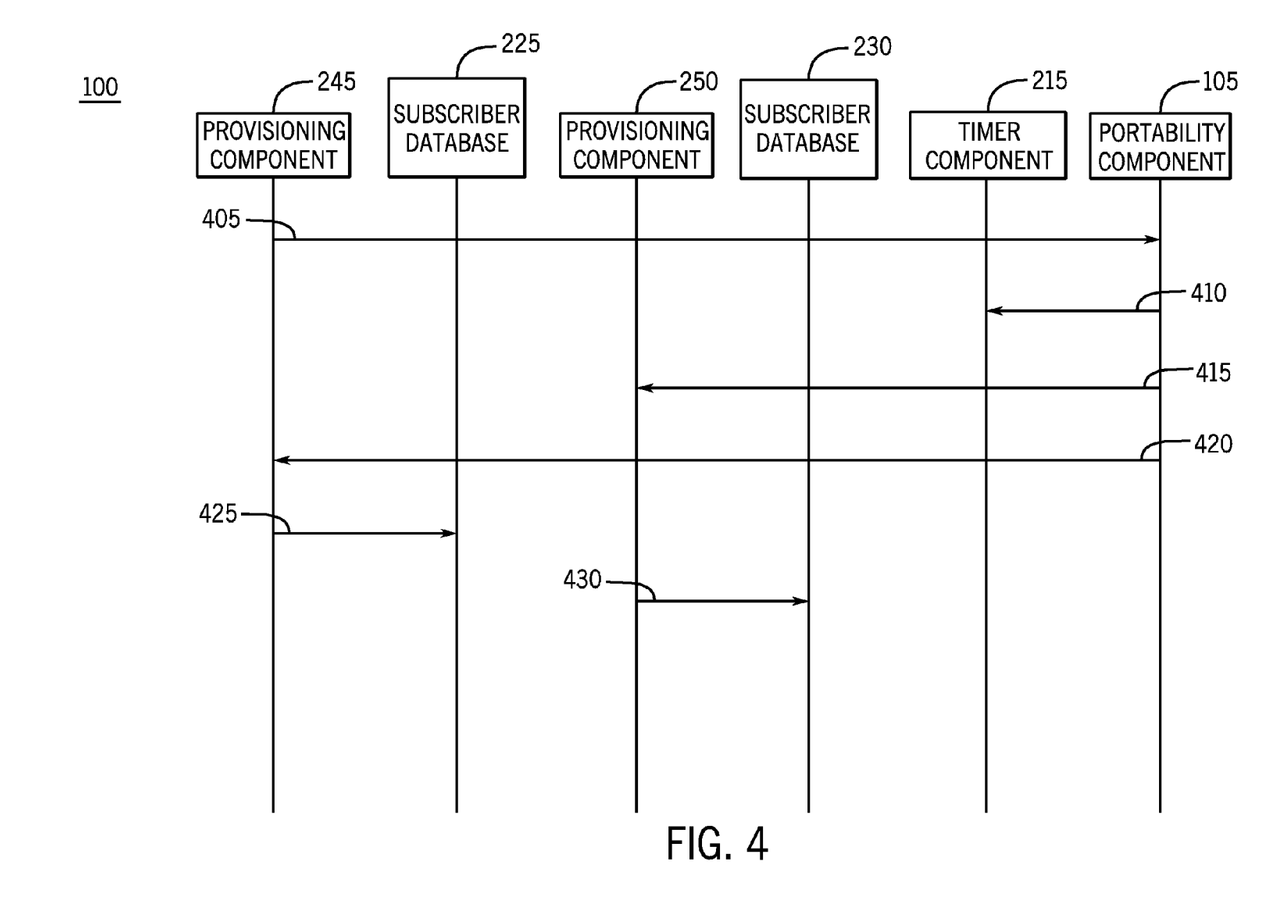
FIG. 4 is a representation of an exemplary process flow of a request to make permanent a ported directory number received by the portability component from a provisioning component of the apparatus of FIG. 2.

Turning to FIG. 4, the portability component 105 updates one or more network components to make permanent a port of a directory number from the network 115 to the network 120. In STEP 405, the provisioning component 245 initiates a request to the portability component 105 to make permanent the port of the directory number. The portability component 105 removes the association of the directory number. In STEP 410, the portability component 105 employs an identifier associated with the timer component 215 to update the timer component 215. The timer component 215 removes the value for the duration of time to port the directory number.

In STEP 415, the portability component 105 employs an identifier associated with the provisioning component 250 to update the provisioning component 250 to make permanent the port for the directory number. In STEP 420, the portability component 105 employs an identifier associated with the provisioning component 245 to update the provisioning component 245 to make permanent the port for the directory number. In STEPS 425 and 430, the provisioning components 245 and 250 update the subscriber databases 225 and 230 respectively. The directory number is permanently ported from the network 115 to the network 120.

Figure 5:
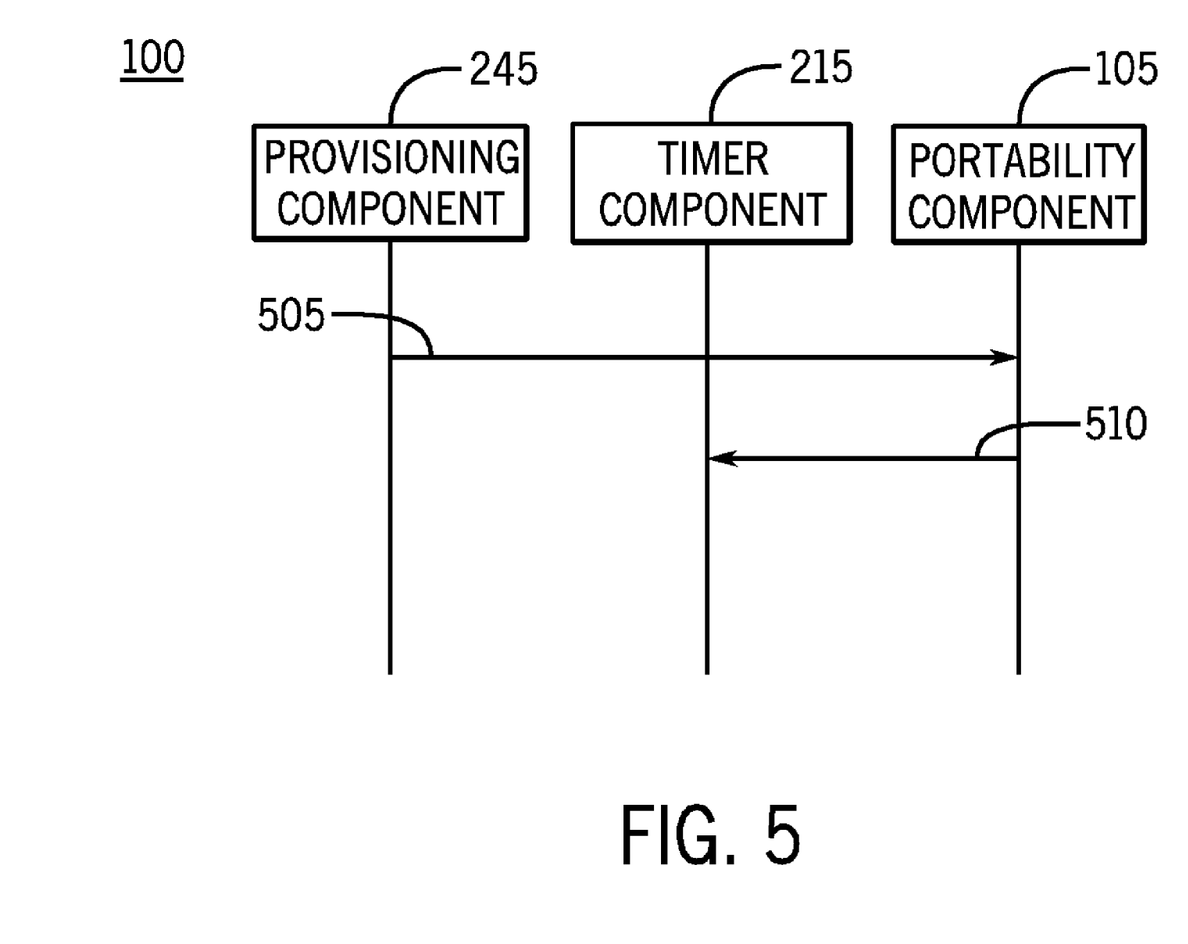
FIG. 5 is a representation of an exemplary process flow of resetting a value of a duration of time to port a directory number by the portability component of the apparatus of FIG. 1.

Turning to FIG. 5, the portability component 105 receives a request to reset a value for a duration of time to port a directory number. In STEP 505, the provisioning component 245 sends the request to the portability component 105 to provide a second value for the duration of time to port the directory number from the network 115 to the network 120. In STEP 510, the portability component 105 communicates with the timer component 215 to provide the second value for the duration of time through employment of an identifier associated with the timer component 215. The timer component 215 updates a timer associated with the directory number with the second value.

The apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs at least one computer readable medium. One example of a computer-readable medium for the apparatus 100 comprises an instance of a recordable data storage medium such as one or more of a magnetic, electrical, optical, biological, and atomic data storage medium. The recordable data storage medium in one example comprises the storage devices 203, 206, 207, 208, 209, 211, and 212. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   one or more provisioning components that run on a hardware component, the one or more provisioning components being operable to:
      initiate requests to port a directory number for a duration of time, wherein a value for the duration of time consists of a period of time, a permanent status, and a date in the future;
      receive updates for one or more directory numbers ported from a first service provider to a second service provider, and notify a subscriber database of the directory number to port for the duration of time; and
   a portability component that runs on a hardware component automatically updates the one or more provisioning components to port the directory number for the duration of time;
      wherein the portability component communicates with a management component through employment of one or more protocols to update one or more local number portability databases, at least one of the one or more protocols being a Simple Network Management Protocol (SNMP) or a Session Initiation Protocol (SIP);
         wherein the portability component communicates with the management component to initiate one or more notifications of an expiration of the duration of time.

2. The apparatus of claim 1, wherein upon initiation of a request to port the directory number, the portability component receives one or more identifiers associated with the one or more provisioning components; and
   wherein the portability component employs the one or more identifiers to notify the one or more provisioning components of the request to port the directory number for the duration of time.

3. The apparatus of claim 2, wherein the request to port the directory number comprises an association between the directory number and a location routing number, and
   wherein upon initiation of the request to port the directory number, the portability component provides the association to the management component; and
   wherein the management component provides the association to the one or more local number portability databases associated with the one or more provisioning components; and
   wherein one or more network components associated with the one or more provisioning components and the one or more local number portability databases cooperate to provide and/or terminate service for the directory number for the duration of time based on the association.

4. The apparatus of claim 2, wherein the one or more provisioning components comprise a ported-from provisioning component and a ported-to provisioning component, and wherein the one or more identifiers associated with the one or more provisioning components comprise a first identifier associated with the ported-from provisioning component and a second identifier associated with the ported-to provisioning component; and
   wherein the directory number is associated with a telephony device, and wherein the portability component communicates with the ported-from provisioning component through employment of the first identifier to terminate service for the telephony device for the duration of time; and
   wherein the portability component communicates with the ported-to provisioning component through employment of the second identifier to provide service for the telephony device for the duration of time.

5. The apparatus of claim 4, wherein the ported-from provisioning component is associated with a first service provider, and wherein the ported-to provisioning component is associated with a second service provider; and
   wherein the portability component cooperates with the ported-from provisioning component and the ported-to provisioning component to port the directory number from the first service provider to the second service provider for the duration of time.

6. The apparatus of claim 4, wherein the ported-from provisioning component provides a first set of services to the telephony device, and wherein the ported-to provisioning component provides a second set of services to the telephony device; and
   wherein the portability component cooperates with the ported-from provisioning component to terminate access to the first set of services by the telephony device for the duration of time; and
   wherein the portability component cooperates with the ported to provisioning component to provide access to the second set of services by the telephony device for the duration of time.

7. The apparatus of claim 1, wherein upon expiration of the duration of time, the portability component in combination with the one or more provisioning components port the directory number back to an initial state.

8. The apparatus of claim 7, wherein the one or more provisioning components comprise a ported-from provisioning component and a ported-to provisioning component; and
   wherein the ported-to provisioning component initiates a request to the portability component to port the directory number for the duration of time; and
   wherein upon receipt of the request to port the directory number, the portability component notifies the ported-from provisioning component of the request to port the directory number.

9. The apparatus of claim 8, further comprising:
   a subscriber database that comprises a subscriber entry for the directory number,
   wherein the portability component and the ported-from provisioning component cooperate to change the subscriber entry in the subscriber database from the initial state to a ported state; and
   wherein the subscriber database and a switch component cooperate to terminate service at the network for a telephony device associated with the directory number.

10. The apparatus of claim 9, wherein upon expiration of the duration of time, the portability component and the ported-from provisioning component cooperate to change the subscriber entry in the subscriber database from the ported state to the initial state; and wherein the subscriber database and the switch component cooperate to restart the service at the network for the telephony device associated with the directory number.

11. The apparatus of claim 10, wherein the subscriber database and the switch component cooperate to notify one or more callers to the directory number of the expiration of the duration of time to port the directory number.

12. The apparatus of claim 9, wherein the subscriber database and the switch component cooperate to notify a user of the telephony device associated with the directory number of a period of time remaining until the expiration of the duration of time to port the directory number.

13. The apparatus of claim 1, wherein one of the one or more provisioning components initiates a request to port the directory number for the duration of time, and wherein the request comprises a value for the duration of time, the apparatus further comprising:

a timer component that determines an expiration of the duration of time to port the directory number based on the value for the duration of time;

wherein upon the expiration of the duration of time to port the directory number, the portability component and the timer component cooperate to port the directory number back to an initial state.

14. The apparatus of claim 13, wherein upon the expiration of the duration of time to port the directory number, the timer component sends to the portability component a notification of the expiration of the duration of time and the directory number, and wherein upon receipt of the notification from the timer component, the portability component employs the directory number to notify the one or more provisioning components of the expiration of the duration of time associated with the directory number, and wherein the one or more provisioning components port the directory number back to the initial state.

15. The apparatus of claim 13, wherein the value for the duration of time comprises a first value for the duration of time; and wherein upon receipt of a request to reset the value for the duration of time, the portability component provides a second value for the duration of time to the timer component; and wherein the timer component employs the second value for the duration of time to determine the expiration of the duration of time.

16. The apparatus of claim 1, wherein the portability component comprises one or more interfaces with the one or more provisioning components, and wherein the portability component employs the one or more interfaces to receive one or more identifiers associated with the one or more provisioning components and a value for the duration of time from the one or more provisioning components.

17. The apparatus of claim 1, wherein the portability component stores an association between the directory number and one or more location routing numbers, and wherein a telephony device associated with the directory number receives service associated with the location routing number; and wherein upon an expiration of the duration of time, the portability component removes the association between the directory number and the location routing number, and wherein the telephony device receives service associated with the directory number and/or one of the one or more location routing numbers.

18. A method, comprising the steps of:

automatically updating, via a portability component that runs on a hardware component, one or more provisioning components to port a directory number;

wherein the one or more provisioning components initiate requests to port the directory number for a duration of time, wherein a value for the duration of time consists of a period of time, a permanent status, and a date in the future;

receive updates for one or more directory numbers ported from a first service provider to a second service provider, and notifies a subscriber database of the directory number to port for the duration of time; and communicating with a management component through employment of one or more protocols to update one or more local number portability databases, at least one of the one or more protocols being a Simple Network Management Protocol (SNMP) or a Session Initiation Protocol (SIP);

wherein the portability component communicates with the management component to initiate one or more notifications of an expiration of the duration of time.

19. The method of claim 18, wherein the step of automatically updating, via a portability component that runs on a hardware component, the one or more provisioning components to port the directory number for the duration of time comprises the steps of:

receiving a request to port the directory number, wherein the request comprises one or more identifiers associated with the one or more provisioning components, a value for the duration of time, and an association between the directory number and a location routing number;

providing the association to one or more of the one or more provisioning components through employment of one or more of the one or more identifiers upon receipt of the request;

setting a ported-out flag associated with the directory number;

determining an expiration of the duration of time through employment of the value for the duration of time;

notifying one or more of the one or more provisioning components through employment of one or more of the one or more identifiers upon the expiration of the duration of time; and clearing the ported-out flag associated with the directory number upon the expiration of the duration of time.

20. The method of claim 19, wherein a first provisioning component of the one or more provisioning components is associated with a first service provider, and wherein a second provisioning component of the one or more provisioning components is associated with a second service provider, and wherein the step of clearing the ported-out flag associated with the directory number upon the expiration of the duration of time, the method further comprising the steps of:

porting the directory number from a network of the first service provider to a network of the second service provider;

terminating service for a telephony device associated with the directory number on the network of the first service provider;

providing service for the telephony device on the network of the second service provider;

receiving a notification of the expiration of the duration of time;

porting the directory number from the network of the first service provider to the network of the second service provider;

terminating service for the telephony device associated with the directory number with the second service provider; and providing a message indicating the expiration of the duration of time to a user of the telephony device associated with the directory number.

21. A computer-readable storage medium having computer executable instructions that can be executed by a computer for performing steps, comprising:

means in the computer-readable storage medium for automatically updating one or more provisioning components to port a directory number;

wherein the one or more provisioning components initiate requests to port the directory number for a duration of time, wherein a value for the duration of time consists of a period of time, a permanent status, and a date in the future;

receive updates for one or more directory numbers ported from a first service provider to a second service provider, and notifies a subscriber database of the directory number to port for the duration of time; and     means in the computer-readable storage medium for communicating with a management component through employment of one or more protocols to update one or more local number portability databases, at least one of the one or more protocols being a Simple Network Management Protocol (SNMP) or a Session Initiation Protocol (SIP);

wherein the portability component communicates with the management component to initiate one or more notifications of an expiration of the duration of time.

22. The apparatus of claim 1, wherein the portability component and one or more networks communicate through employment of a Session Initiation Protocol (SIP), an Internet Standard-41 (IS-41), or an Advanced Intelligence Network (AIN).

23. The apparatus of claim 4, wherein the telephony device is a personal computer.

24. The apparatus of claim 4, wherein the telephony device is a wired telephone.

25. The apparatus of claim 4, wherein the telephony device is a wireless telephone.

\* \* \* \* \*